United States Patent
Baucke et al.

(10) Patent No.: US 10,723,632 B2
(45) Date of Patent: Jul. 28, 2020

(54) MAGNESIUM SULFATE GRANULATES BASED ON SYNTHETIC MAGNESIUM SULPHATE

(71) Applicant: K+S Aktiengesellschaft, Kassel (DE)

(72) Inventors: Guido Baucke, Schenklengsfeld OT Wippershain (DE); Armin Dietrich, Weissenborn (DE); David Scherr, Huenfeld (DE); Ludger Waldmann, Telgte (DE)

(73) Assignee: K+S Aktiengesellschaft, Kassel (DE)

( * ) Notice: Subject to any disclaimer, the term of this patent is extended or adjusted under 35 U.S.C. 154(b) by 0 days.

(21) Appl. No.: 16/492,418

(22) PCT Filed: Mar. 7, 2018

(86) PCT No.: PCT/DE2018/000057
§ 371 (c)(1),
(2) Date: Sep. 9, 2019

(87) PCT Pub. No.: WO2018/161984
PCT Pub. Date: Sep. 13, 2018

(65) Prior Publication Data
US 2020/0039832 A1 Feb. 6, 2020

(30) Foreign Application Priority Data
Mar. 8, 2017 (DE) .................. 10 2017 104 877

(51) Int. Cl.
*C01F 5/40* (2006.01)
*C05D 5/00* (2006.01)
*C05C 9/00* (2006.01)
*C05G 1/00* (2006.01)
*C05G 3/00* (2020.01)
*C05G 5/12* (2020.01)

(52) U.S. Cl.
CPC .................. *C01F 5/40* (2013.01); *C05C 9/00* (2013.01); *C05D 5/00* (2013.01); *C05G 1/00* (2013.01); *C05G 5/12* (2020.02); *C01P 2004/60* (2013.01); *C01P 2006/82* (2013.01)

(58) Field of Classification Search
CPC ..... C01F 5/40; C05C 9/00; C05D 5/00; C01P 2004/60; C01P 2006/82; C05G 5/12; C05G 1/00
See application file for complete search history.

(56) References Cited

U.S. PATENT DOCUMENTS

| 4,792,350 | A | 12/1988 | Löblich et al. |
| 4,848,675 | A | 7/1989 | Loeblich et al. |
| 5,431,708 | A | 7/1995 | Lehmann et al. |
| 8,603,211 | B2 | 12/2013 | Rahn et al. |
| 9,073,797 | B2 * | 7/2015 | Demosthenous ........ C05D 5/00 |
| 9,663,410 | B2 * | 5/2017 | Kleine-Kleffmann .... C05C 9/00 |
| 9,994,491 | B2 * | 6/2018 | Dietrich ................. A01G 22/00 |
| 2014/0360239 | A1 * | 12/2014 | Kleine-Kleffmann .... C05C 9/00 71/28 |
| 2016/0046534 | A1 * | 2/2016 | Dietrich ................... C05D 9/00 47/58.1 R |

FOREIGN PATENT DOCUMENTS

| CN | 101486596 | | 7/2009 | |
| CN | 101624299 | | 1/2010 | |
| CN | 106467313 | | 3/2017 | |
| CN | 107986305 | A * | 5/2018 | ............... C01F 5/40 |
| DE | 36 18 058 | | 2/1987 | |
| DE | 37 07 785 | | 3/1988 | |
| DE | 42 32 567 | | 2/1994 | |
| DE | 43 03 984 | | 3/1994 | |
| DE | 10 2013 010 765 | | 12/2014 | |
| EP | 0 808 298 | | 9/1998 | |
| EP | 1 219 571 | | 4/2012 | |
| EP | 3038995 | A2 * | 7/2016 | ............. A01G 22/00 |
| GB | 1 359 884 | | 7/1974 | |
| GB | 1 366 641 | | 9/1974 | |
| WO | 2009/079994 | | 7/2009 | |
| WO | 2013/098367 | | 7/2013 | |
| WO | WO 2013/098367 | A1 * | 7/2013 | ............... C05F 9/04 |
| WO | 2014/096372 | | 6/2014 | |
| WO | WO 2014096372 | A2 * | 6/2014 | .............. C05C 9/00 |

OTHER PUBLICATIONS

International Search Report dated Jun. 4, 2018 in PCT/DE2018/000057 with English translation.
Written Opinion dated Jun. 4, 2018 in PCT/DE2018/000057.
W. von Rheinbaben, Fertilizer Research; 1987, 11:149-159.

* cited by examiner

*Primary Examiner* — Timothy C Vanoy
(74) *Attorney, Agent, or Firm* — Grüneberg and Myers PLLC

(57) ABSTRACT

Magnesium sulfate granulates contain at least 90 wt. % synthetic magnesium sulphate hydrate with respect to the total mass of the magnesium sulphate granulate, and have a dry loss of less than 2 wt. % determined by drying of the granulate for 2 hours at 105° C. and 1 bar. Further, a method is used for producing said magnesium sulfate granulates and to their use in urea-containing fertilizer compositions.

20 Claims, No Drawings

MAGNESIUM SULFATE GRANULATES BASED ON SYNTHETIC MAGNESIUM SULPHATE

This application is a National Stage entry under § 371 of International Application No. PCT/DE2018/000057, filed on Mar. 7, 2018, and which claims the benefit of German Application No. 10 2017 104 877.4, filed on Mar. 8, 2017.

The present invention relates to magnesium sulfate granules and to the use thereof for production of solid, urea-containing fertilizer compositions. The invention also relates to a process for producing these granules.

Even though magnesium, as the eighth most common element, is present to an extent of about 1.94% in the Earth's crust, soils are often deficient in magnesium. Therefore, magnesium salts are widely used as fertilizers or fertilizer additions. More particularly, magnesium sulfate is used as fertilizer or fertilizer additive, frequently in the form of the monohydrate or 5/4 hydrate. Magnesium sulfate is typically used here in the form of magnesium sulfate-containing granules optionally containing macronutrients such as potassium, phosphorus and nitrogen, and optionally trace elements such as manganese, zinc, copper, iron, molybdenum or boron.

It is frequently the case that fertilization using magnesium sulfate together with urea would be desirable. For instance, B. von Rheinbaben, Fertilizer Research 11 (1987) states that the joint use of magnesium sulfate monohydrate and urea leads to a reduction in nitrogen loss. However, there are limits to the joint use of magnesium and nitrogen. For instance, solid mixtures of magnesium sulfate granules and urea are not storage-stable. It is frequently the case that the two mixing partners and the surrounding air humidity react even after a short time, forming pasty masses that additionally readily undergo deliquescence and are therefore difficult to handle and can no longer be deployed as fertilizers in solid form. Even in the case of storage under dry conditions, clumping of the mixture, called agglomerates, is observed after a period of time. These problems occur especially in the case of granules having a high proportion of magnesium.

GB 1359884 suggests using aqueous concentrates that are obtained by mixing a magnesium sulfate containing water of hydration or water of crystallization, e.g. bitter salt (magnesium sulfate hexahydrate), with solid urea. But liquid fertilizer compositions are less suitable for some applications than solid fertilizer compositions.

WO 2013/098367 proposes solving this problem by using magnesium sulfate and urea in the form of a complex [MgSO$_4$.m CO(NH$_2$)$_2$.n H$_2$O] in which in is in the range from 0.9 to 1.1 and n is in the range from 2.9 to 3.1, where the compositions described therein may contain little or no free MgSO$_4$ and less than 10% by weight of unbound urea.

A similar approach to a solution is pursued by WO 2014/096372, wherein compositions containing a mixture of two magnesium sulfate-urea complexes are used. A disadvantage is that the complexes have to be prepared beforehand. Moreover, this permits only the use of magnesium sulfate and urea within a narrow ratio.

DE 3618058 describes a process for producing granules based on kieserite by rolling agglomeration of finely divided kieserite or kieserite-potassium sulfate mixtures with addition of mono-, di- or polysaccharides as binders or consolidants. The mechanical properties thus achieved in granules having a kieserite content >90% by weight are unsatisfactory.

DE 3707785 describes a process for producing granules based on kieserite by rolling agglomeration of kieserite dust in a mixture with ground reject material with addition of water and water-soluble phosphates as binder or consolidant. Without added phosphate the mechanical strengths are poor, and even with added phosphate abrasion is unsatisfactory.

DE 4303984 describes a process for producing granules based on kieserite by rolling agglomeration of kieserite dust in a mixture with ground reject material with addition of water and a mixture of ammonium salts, such as ammonium sulfate, borax and mono- or disaccharides, and drying the granules to residual moisture values of 0.5% to 2% by weight. However, the granules thus obtained feature a low fracture resistance of not more than 21 N.

EP 1219571 describes the production of mineral fertilizer granules using organic chelating agents, namely the salts of dicarboxylic acids, polycarboxylic acids, hydroxycarboxylic acids, fruit acids, amidocarboxylic acids and polypeptides.

DE 4232567 describes the use of aqueous urea solutions for reducing the tendency of sulfate granules, for example of kieserite granules, to form dust.

It is therefore an object of the invention to provide magnesium sulfate granules that result in a storage-stable fertilizer composition when mixed with solid urea. The mixtures obtained should be storage-stable under ambient conditions, i.e. should not undergo deliquescence and as far as possible should not cake or form agglomerates. Moreover, the magnesium sulfate granules should be mechanically stable to assure good transportability. More particularly, the magnesium sulfate granules should simultaneously have an adequate cracking resistance of preferably at least 30 N, particularly at least 35 N, especially at least 40 N, and a low abrasion of less than 2% by weight, especially less than 1% by weight.

It has been found that, surprisingly, magnesium sulfate granules having a drying loss of less than 2% by weight, preferably less than 1.5% by weight, particularly not more than 1% by weight and especially not more than 0.5% by weight, when mixed with solid urea, do not show the problems outlined at the outset, but form free-flowing, storage-stable mixtures. However, the problem that arises here is that conventional granules based on natural magnesium sulfate hydrate, i.e. based on kieserite, have only low mechanical stability and not very satisfactory high abrasion when the drying loss is less than 2% by weight, especially less than 1% by weight. It has been found that, surprisingly, magnesium sulfate granules consisting of a synthetic magnesium sulfate hydrate to an extent of at least 90% by weight, particularly to an extent of at least 95% by weight and especially to an extent of at least 98% by weight, even in the case of low drying losses of less than 2% by weight, preferably less than 1.5% by weight, particularly not more than 1% by weight and especially not more than 0.5% by weight, have the desired mechanical properties, i.e. a high cracking resistance or fracture resistance of at least 30 N and a low abrasion of generally less than 2% by weight. Surprisingly, it is not necessary for the achievement of the desired mechanical properties to use organic binders or inorganic binder salts.

Accordingly, the present invention relates to magnesium sulfate granules consisting of a synthetic magnesium sulfate hydrate to an extent of at least 90% by weight, particularly to an extent of at least 95% by weight and especially to an extent of at least 98% by weight, based on the total mass of the magnesium sulfate granules, and having a drying loss of less than 2% by weight, preferably less than 1.5% by weight, particularly not more than 1% by weight, especially not more than 0.5% by weight, determined by drying the granules at 105° C. and 1 bar for 2 h.

Such magnesium sulfate granules generally have a cracking resistance of preferably at least 30 N, particularly at least 35 N, especially at least 40 N, and a low abrasion of typically less than 2% by weight. The fertilizer compositions obtained on mixing of the granules of the invention with solid urea, especially with urea granules or prilled urea, are storage-stable and, even in the case of prolonged storage for 20 days or longer, for example, especially even after 30 days or longer, do not show any deliquescence or formation of agglomerates. Unlike in the prior art, it is not necessary first to prepare complexes from urea and magnesium sulfate or to dissolve urea and introduce the solution to the granulation process. Therefore, such magnesium granules open up the production of fertilizer compositions having very different contents of solid urea.

The magnesium sulfate granules of the invention, by contrast with commercially available magnesium sulfate granules based on synthetic magnesium sulfate, have only a low drying loss which is preferably less than 1.5% by weight, particularly not more than 1.0% by weight and especially not more than 0.5% by weight, and is, for example, in the range from 0.01% to <1.5% by weight, particularly in the range from 0.05% to 1% by weight and especially in the range from 0.1% to 0.5% by weight, determined in each case by drying the granules at 105° C. and 1 bar for 2 h.

Here and hereinafter, the terms dry loss and drying loss are used synonymously. This drying loss is typically determined in accordance with DIN EN 12880:2000 by drying a sample to constant weight at temperatures in the region of 105±5° C. at ambient pressure. In general, the drying is effected in a drying cabinet. The time needed to attain constant weight in the case of magnesium sulfate granules is typically below 2 h. The drying residue in % is ascertained here by weighing before and after the drying, based on the starting weight used. The drying loss in % is calculated from the drying residue in % by subtraction from 100.

The magnesium sulfate granules of the invention consist of synthetic magnesium sulfate hydrate to an extent of at least 90% by weight, particularly to an extent of at least 95% by weight and especially to an extent of at least 98% by weight, or do so exclusively. Synthetic magnesium sulfate hydrate, also SMS hereinafter, is understood to mean a magnesium sulfate hydrate obtainable by digesting magnesium oxide with sulfuric acid, especially with a 50% to 90% by weight aqueous sulfuric acid. By comparison with magnesium sulfate hydrate from natural sources such as kieserite, SMS generally contains smaller amounts of halides and a higher proportion of water-insoluble magnesium in the form of water-insoluble magnesium oxide. More particularly, the proportion of water-insoluble magnesium, based on the total mass of the SMS and calculated as MgO, is in the range from 1.5% to 7.0% by weight, especially in the range from 2.0% to 6.0% by weight. The proportion of salts other than magnesium sulfate and magnesium oxide in the SMS is generally less than 3% by weight, especially less than 2.5% by weight, based on the total mass of the SMS. The total content of magnesium in the SMS is generally at least 26% by weight, particularly at least 27% by weight, calculated as MgO, and is frequently in the range from 26% to 30% by weight, especially 27% to 30% by weight.

In the SMS, the magnesium sulfate is mainly in the form of magnesium sulfate monohydrate or of a mixture of magnesium sulfate monohydrate with magnesium sulfate 5/4 hydrate, where small amounts of magnesium sulfate dihydrate may also be present in the SMS. Preferably, the proportion of magnesium sulfate monohydrate and magnesium sulfate 5/4 hydrate in the SMS is at least 90% by weight, based on the total mass of the SMS. Particular preference is given to magnesium sulfate granules in which the magnesium sulfate in the SMS is in the form of magnesium sulfate monohydrate to an extent of at least 90% by weight, based on the total amount of magnesium sulfate plus water of hydration. More particularly, the content of water of crystallization in the magnesium sulfate granules is 18.0% to 22% by weight, based on the total mass of the SMS and determined via the ignition loss at 550° C.

Accordingly, the magnesium sulfate granules of the invention, as well as the aforementioned low drying loss, frequently have at least one of or all the following features:

The proportion of water-soluble magnesium, based on the total mass of the magnesium sulfate granules of the invention and calculated as MgO, is in the range from 20% to 25% by weight, especially 22% to 25% by weight.

The proportion of water-insoluble magnesium, based on the total mass of the magnesium sulfate granules of the invention and calculated as MgO, is in the range from 1.5% to 7.0% by weight, especially in the range from 2.0% to 6.0% by weight.

The total content of magnesium (water-soluble MgO and water-insoluble MgO), based on the total mass of the magnesium sulfate granules of the invention and calculated as MgO, is generally at least 26% by weight, particularly at least 27% by weight, and is frequently in the range from 26% to 30% by weight, especially 27% to 30% by weight.

The proportion of water of hydration, determined by ignition loss at 550° C., is 18.0% to 22% by weight, based on the total mass of the magnesium sulfate granules of the invention.

The proportion of monohydrate and/or 5/4 hydrate, based on the total mass of the magnesium sulfate+water of hydration present in the magnesium sulfate granules, is at least 90% by weight. More particularly, the proportion of monohydrate, based on the total mass of the magnesium sulfate and water of hydration present in the magnesium sulfate granules, is at least 90% by weight.

The proportion of salts other than magnesium sulfate and magnesium oxide is less than 3.0% by weight, especially not more than 2.5% by weight, based on the total mass of the magnesium sulfate granules of the invention.

As well as the synthetic magnesium sulfate hydrate, the magnesium sulfate granules may also contain a small amount of inorganic compounds other than magnesium sulfate and magnesium oxide, for example compounds from the group of $MgCO_3$, $CaSO_4$, $Na_2SO_4$, $K_2SO_4$, KCl and NaCl and hydrates thereof. The proportion of such compounds will generally not exceed 10% by weight, particularly 5% by weight and especially 2% by weight, based on the total mass of the constituents of the magnesium granules of the invention.

In addition, the magnesium sulfate granules may also contain micronutrients. These include, as well as boron that has already been mentioned, the elements manganese, zinc, copper, iron and molybdenum, which are typically used in the granules in the form of their salts or complexes. Manganese, copper and iron are preferably used in the form of their sulfates. Copper and iron are preferably also used in the form of chelates, for example with EDTA. Boron is preferably used in the form of calcium sodium borate, for example in the form of ulexite, sodium borate, potassium borate or boric acid. Molybdenum is preferably used in the form of sodium molybdate or ammonium molybdate or of a mixture thereof. Typically, the proportion of micronutrients other than boron, calculated in their elemental form, will not exceed 1% by weight, based on the total mass of the constituents of the magnesium sulfate granules used in accordance with the invention. The content of boron, calculated as $B_2O_3$, will generally not exceed 3% by weight and is typically, if present, in the range from 0.01% to 3% by weight, especially 0.01% to 2% by weight, based on the total mass of the constituents of the magnesium sulfate granules used in accordance with the invention.

By contrast with conventional magnesium sulfate granules, no organic binders are required in the magnesium sulfate granules of the invention that are based on synthetic magnesium sulfate hydrate since these granules have a higher mechanical strength which is still sufficient even in the case of low residual moisture contents. Accordingly, the proportion of any organic binders will typically not exceed 0.1% by weight. In preferred embodiments, the magnesium sulfate granules of the invention do not contain any organic binders.

In a specific embodiment of the invention, the magnesium sulfate granules consist exclusively or virtually exclusively, i.e. to an extent of at least 99% by weight, of synthetic magnesium sulfate hydrate and optionally small amounts of water.

The magnesium sulfate granules of the invention that are based on synthetic magnesium sulfate hydrate, even in the case of drying losses of below 2% by weight, particularly not more than 1% by weight and especially not more than 0.5% by weight, for example 0.05% to 1% by weight and especially 0.1% to 0.5% by weight, have a fracture resistance or cracking resistance of at least 30 N, particularly at least 35 N, especially at least 40 N, e.g. 30 to 70 N, particularly 35 to 60 N and especially 40 to 45 N. The abrasion of such granules even in the case of the abovementioned drying losses is generally below 2% by weight, particularly below 1.5% by weight and especially below 1% by weight.

The cracking resistance values reported here and hereinafter are averages that have been ascertained by measuring the cracking resistance of 56 granules in the particle size range from 2.5 to 3.15 mm. The terms "cracking resistance" and "fracture resistance" are used synonymously.

The abrasion values reported here and hereinafter were determined by the rolling drum process according to Busch (see also rolling drum method No. 5 in H. Rieschel, K. Zech, Vergleich verschiedener Prüfmethoden zur Qualitätsprüfung von Kaligranulat [Comparison of Various Test Methods for Testing the Quality of Potash Granules]. No. 10.3. Reprint from "Autbereitungs-Technik", Hattingen, edition September 1981).

Preferably, the magnesium sulfate granules of the invention have a small proportion of particles having a particle size or grain size below 1 mm. In particular, the proportion of granule particles, granules hereinafter, having a grain size below 1 mm is less than 10% by weight, especially less than 5% by weight. For use in fertilizers, it is also advantageous when less than 10% by weight of the granules in the magnesium sulfate granules has a grain size below 2 mm. Frequently at least 60% by weight, particularly at least 80% by weight and especially at least 90% by weight of the granules have a grain size of less than 5 mm. Preferably, the grain size of the granules is in the range from 2 to 5 mm to an extent of at least 60% by weight, particularly to an extent of at least 80% by weight and especially to an extent of at least 90% by weight. The distribution of the grain sizes of the granules can be determined by sieve analysis in a manner known per se and is based on the diameter of the granules.

The magnesium sulfate granules of the invention are generally not commercially available. However, they can be produced from commercially available magnesium sulfate granules in a simple manner by drying. The drying is preferably effected at temperatures in the range from 90 to 130° C., but can also be effected at lower temperatures or higher temperatures. The drying temperature will preferably not exceed 200° C. in order to avoid complete dehydration. The drying is typically effected at ambient pressure or in the range from 900 to 1200 mbar, although higher or lower pressures may be employed. The drying tune is guided in particular by the drying temperature and is generally conducted until the desired drying loss has been attained. The duration needed for the purpose can be ascertained by routine studies. The drying lime is generally 0.1 to 4 h. The drying can be effected in the apparatus customary for the drying of granules, such as belt driers, rotary furnaces, drying drums, fluidized bed driers or pan driers.

The magnesium sulfate granules to be dried can be produced in analogy to processes known per se for production of granules from finely divided inorganic salts, as known, for example, from the prior art cited at the outset and described, for example, in Wolfgang Pietsch, Agglomeration Processes, Wiley—VCH, 1st edition, 2002, in G. Heinze, Handbuch der Agglomerationstechnik [Handbook of Agglomeration Technology], Wiley—VCH, 2000, and in Perry's Chemical Engineers' Handbook, 7th edition, McGraw-Hill, 1997, p. 20-56 to 20-89.

More particularly, the magnesium sulfate granules to be dried are produced by buildup agglomeration of finely divided synthetic magnesium sulfate hydrate with addition of small amounts of water in order to achieve wetting and agglomeration of the finely divided synthetic magnesium sulfate hydrate owing to capillary forces. In general, water is used in an amount in the range from 3% to 15% by weight, especially in an amount from 5% to 10% by weight, based on the starting material to be granulated. The use of other binders is not required and therefore generally amounts to not more than 0.1% by weight, based on the starting material to be granulated.

Buildup agglomeration can be effected in a manner known per se as a rolling agglomeration, mixing agglomeration or fluidized bed agglomeration, especially as a rolling agglomeration. In rolling agglomeration, the raw material to be granulated will be introduced into a vessel with an inclined axis of rotation and circular cross section, preferably into a granulating drum or onto a granulating pan. By rotating the vessel, the particles of the fine salt are set in motion. The treatment with the water is effected, for example, by spraying onto the magnesium sulfate that has been set in motion. This affords comparatively uniform, round granules that can be sent directly to a classification and/or drying.

In a specific embodiment, the granulation apparatus used for the rolling agglomeration is an apparatus having a cylindrical rotating vessel to accommodate the constituents to be granulated, the axis of rotation of which is inclined relative to the vertical, wherein the vessel has at least one rotating mixing tool arranged eccentrically with respect to the center of rotation of the vessel, especially a rotating mixing tool with multiple paddles in the form of blades that are arranged on a rotating shaft and at least one scraper arranged eccentrically with respect to the center of rotation of the vessel. Such granulating apparatuses are known and commercially available, for example as Eirich intensive mixers from Maschinenfabrik Gustav Eirich GmbH & Co. KG, Hardheim, Germany.

The synthetic magnesium sulfate hydrate required for the production of the magnesium sulfate granules of the invention can be produced in a manner known per se and is especially produced by digestion of magnesium oxide with aqueous sulfuric acid. The digestion of magnesium oxide with aqueous sulfuric acid is known per se and is described, for example, in CN 101486596 or CN 101624299. The aqueous sulfuric acid used for the digestion typically has an $H_2SO_4$ concentration in the range from 50% to 90% by weight, especially in the range from 55% to 85% by weight. The magnesium oxide used for digestion is typically a magnesium oxide obtained by calcination of magnesite or other magnesium carbonate minerals that may naturally still contain small amounts of unconverted magnesium carbonate. The magnesium oxide used preferably has an MgO content of at least 80% by weight, especially at least 85% by weight. The sulfuric acid is preferably used in a slightly substoichiometric amount based on the reaction shown in the following reaction equation:

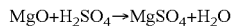

$$MgO + H_2SO_4 \rightarrow MgSO_4 + H_2O$$

In particular, the sulfuric acid is used in an amount of 0.8 to 0.99 mol, especially in an amount of 0.85 mol to 0.98 mol, per mole of magnesium in the magnesium oxide. The digestion is preferably conducted in such a way that the enthalpy of reaction released in the reaction leads to heating of the reaction mixture to temperatures above 100° C., especially above 110° C., for example to temperatures in the range from 120 to 160° C., such that excess water can escape. The procedure here may, for example, be that the sulfuric acid is adjusted to the desired concentration by mixing concentrated sulfuric acid with water and then added to the magnesium oxide with mixing. The procedure may also be that the magnesium oxide is suspended in water or converted to a paste with water and then concentrated sulfuric acid is added to the aqueous suspension or to the aqueous paste with mixing.

More particularly, it has been found to be advantageous when the magnesium sulfate granules of the invention are produced by a process comprising the following steps:
i) digesting magnesium oxide with aqueous sulfuric acid;
ii) granulating the reaction mixture obtained in the digestion by means of a buildup agglomeration to obtain magnesium sulfate granules; and
iii) drying the magnesium sulfate granules to a drying loss of less than 2% by weight, particularly to a drying loss of less than 1% by weight, especially to a drying loss of not more than 0.5% by weight.

Accordingly, a preferred embodiment of the invention relates to magnesium sulfate granules obtainable by a process comprising steps i), ii) and iii), and to such a process.

Step i) can be conducted in the manner described above, wherein it has been found to be advantageous to use the aqueous sulfuric acid in a slightly suhstoichiometric amount as described above. In the preferred embodiment, the reaction product obtained in the reaction of the magnesium oxide with the aqueous sulfuric acid is subsequently subjected to a buildup agglomeration in step ii). In order to convert the finely divided reaction product from the digestion to coarse magnesium sulfate granules. The buildup agglomeration is effected in the manner described above, typically with addition of small amounts of water. The water is generally used in an amount in the range from 3% to 15% by weight, especially in an amount in the range from 5% to 10% by weight, based on the reaction product to be granulated. The buildup agglomeration is especially effected as a rolling agglomeration. Preferably, the rolling agglomeration will then be conducted using a pelletizing pan or a granulating apparatus of the Eirich intensive mixer type.

With regard to the mechanical properties, it has been found to be particularly advantageous when the still-hot reaction mixture obtained in the digestion is subjected directly to a buildup agglomeration, especially a rolling agglomeration, and, after the buildup agglomeration, the magnesium sulfate granules obtained are left to undergo a maturation phase. In this case, the procedure will preferably be to conduct the digestion in such a way that the enthalpy of reaction released in the reaction leads to heating of the reaction mixture to temperatures above 100° C., especially above 110° C., for example to temperatures in the range from 120 to 160° C. The still-hot reaction Mixture obtained here, which is preferably at temperatures of at least 100° C., especially at least 110° C., is then subjected directly to a buildup agglomeration, preferably a rolling agglomeration, in the manner described above. Preferably, the time interval from the commencement of the digestion until the commencement of the buildup agglomeration is not more than 30 min. What is achieved in this way is that the conversion to the magnesium sulfate hydrate on commencement of the agglomeration has still not run to completion and continues during the granulating operation. More particularly, the reaction mixture is at a temperature of at least 100° C. on commencement of the buildup agglomeration.

The actual granulating operation is frequently followed by a maturing phase. For this purpose, the freshly produced granules, also referred to hereinafter as green granules, are left to rest, meaning that any significant mechanical stress is avoided and there is no further particle buildup. It is here that the granules attain their actual strength. The maturation is typically effected at temperatures in the range from 50 to 130° C. The duration of the maturing phase or the dwell time of the granules in the maturing phase is typically 0.2 to 2 h. Typically, the procedure will be that the green granules discharged from the granulating apparatus are transported by means of what is called a maturing belt to a reservoir vessel or to the drying apparatus.

In this way, a granular material having the abovementioned composition is obtained, which still has a comparatively high drying loss typically in the range from 5% to 10% by weight, based on the total mass of the granules.

The granules thus obtained are dried and classified. The classification can be effected before, during or after the drying in step iii). Frequently, the classification precedes the drying in step iii), since the granules obtained at first have a greater strength owing to the higher drying loss. The drying is effected in the manner described above.

The procedure may also be that the drying of the granules is conducted before or during the maturing phase. For example, the still-hot granules obtained in the buildup agglomeration can be dried to the desired residual water content and optionally then left to mature further. The duration of the drying and maturing phase or the dwell time of the granules in the drying and maturing phase is typically 0.2 to 2 h. With regard to the drying conditions, the statements made above are applicable mutatis mutandis. In general, there will then be rapid cooling, followed by classification of the granules.

The magnesium sulfate granules of the invention can be used in a manner known per se as Mg- and S-containing fertilizers. Their advantages are manifested particularly when these magnesium sulfate granules are used for production of solid, urea-containing fertilizer compositions. In these fertilizer compositions, the urea is naturally in solid, particulate form. They are especially suitable for production of solid fertilizer compositions in which the urea is in prilled form or in the form of granules. The prills or granules generally have a urea content of at least 95% by weight, especially at least 98% by weight. The nitrogen content is frequently about 46% by weight. The grain size of the solid urea is typically in the range from 1 to 4 mm, i.e. at least 90% by weight of the prills or of the granule grains have a grain size within this range.

The magnesium sulfate granules of the invention are especially suitable for production of solid fertilizer compositions having a high urea content, especially those in which the mass ratio of magnesium sulfate granules to urea is in the range from 2:1 to 1:10 and especially in the range from 1.5:1 to 1:3.

The solid urea-containing fertilizer compositions consist generally to an extent of at least 60% by weight, based on the total mass of the fertilizer composition, of a mixture of magnesium sulfate granules and urea. As well as the magnesium sulfate granules and the urea, the fertilizer compositions may also contain further fertilizer constituents. These firstly include potassium-containing fertilizers such as potassium sulfate (SOP) and potassium chloride (MOP), and also mixed granules, and additionally phosphorus-containing fertilizers such as superphosphate and triple superphosphate (TSP). These further fertilizers will typically likewise be in solid form, especially in granule form, in the fertilizer composition.

As well as the aforementioned constituents, the fertilizer compositions may contain urease inhibitors and/or nitrification inhibitors. Suitable urease inhibitors are known to those skilled in the art, for example from Kiss et al. (Kiss, S., Simihaian, M. 2002, *Improving Efficiency of Urea Fertilizers by Inhibition of Soil Urease Activity*, ISBN 1-4020-0493-1, Kluwer Academic Publishers, Dordrecht, the Netherlands). Suitable urease inhibitors are in particular N-alkylphosphoramides and N-alkylthiophosphoramides and mixtures thereof, as known, for example, from WO 2009/079994 and the literature cited therein. Preference is given to N-n-butyl thiophosphoramide (NUT), N-n-propylthiophosphoramide (NPPT) and mixtures thereof. Suitable nitrification inhibitors, as well as dicyandiamide, are in particular pyrazoles and the acid addition salts thereof, especially the phosphoric acid addition salts and thiosulfate salts thereof, and also 1-carboxyalkylpyrazoles and mixtures thereof. It is possible here for the pyrazoles and 1-carboxyalkylpyrazoles to be substituted on the carbon atoms by one or more, for example one or two, substituents from the group of $C_1$-$C_4$-alkyl, especially methyl. Such compounds and their use as nitrification inhibitors are known, for example, from U.S. Pat. Nos. 3,635,690, 4,969,946, EP 0808298 and EP 1120388. Preferred nitrification inhibitors are 3-methylpyrazole compounds such as 3-methylpyrazole and the acid addition salts thereof, and also 3,4-dimethylpyrazole (DMP) compounds such as 2-(3,4-dimethylpyrazol-1-yl)succinic acid, N-hydroxymethyl-3,4-dimethylpyrazole and the acid addition salts thereof, and in particular 3,4-dimethylpyrazole and the acid addition salts of 3,4-dimethylpyrazole, especially its phosphoric acid addition salts (DMPP) and thiosulfate salts.

Such fertilizer compositions contain the at least one further constituent from the group of nitrification inhibitors and urease inhibitors generally in an amount of 0.001% to 5% by weight, especially in an amount of 0.002% to 3% by weight, based on the total weight of the fertilizer composition. If such fertilizer compositions contain at least one urease inhibitor, the concentration of urease inhibitor is generally 0.001% to 3% by weight, especially 0.002% to 2% by weight, based on the urea in the fertilizer composition. If such fertilizer compositions contain at least one nitrification inhibitor, the concentration of nitrification inhibitor is generally 0.01% to 3% by weight, especially 0.02% to 2% by weight, based on the total weight of the fertilizer composition, calculated as salt in the case of acid addition salts of pyrazole compounds. If such fertilizer compositions contain at least one urease inhibitor and at least one nitrification inhibitor, the total concentration of nitrification inhibitor+urease inhibitor is generally 0.011% to 5% by weight, especially 0.022% to 3% by weight, based on the total weight of the fertilizer composition. Typically, in that case, the weight ratio of the at least one nitrification inhibitor to the at least one urease inhibitor is generally 1:10 to 10:1 and preferably 1:5 to 5:1.

The fertilizer compositions may optionally contain micronutrients such as manganese, zinc, copper, iron, molybdenum and/or boron. Manganese, copper and iron are preferably used in the form of their sulfates. Copper and iron are preferably also used in the form of chelates, for example with EDTA. Boron is preferably used in the form of calcium sodium borate, sodium borate, potassium borate or boric acid. Molybdenum is preferably used in the form of sodium molybdate or ammonium molybdate or of a mixture thereof. These constituents may be present in the magnesium sulfate granules or in the further fertilizer constituents or be added separately.

The solid, free-flowing fertilizer composition is produced by mixing magnesium sulfate granules as defined here and urea in solid form, especially in the form of granules or prills, and optionally the further fertilizer constituents. The constituents will be used here so as to result in the aforementioned ratios. The mixing can be effected in the manner customary for the blending of particulate solids, especially of grainy solids such as granules and prills. Suitable apparatuses for the blending are freefall mixers with and without internals, such as drum mixers and ring mixers, paddle mixers such as trough mixers, plowshare mixers and twin-shaft mixers, and screw mixers.

The fertilizer compositions thus obtained are storage-stable and do not have a tendency to cake or deliquesce even after prolonged storage.

The examples that follow serve to illustrate the invention.

Drying loss TV was determined in accordance with DIN EN 12880:2000 by drying a sample of about 30 g in a drying cabinet at temperatures in the region of 105±5° C. at ambient pressure for 2 h and determining the weight of the sample before and after the drying.

Cracking resistance or fracture resistance was ascertained with the aid of the TBH 425D tablet hardness tester from ERWEKA on the basis of measurements on 56 individual granules of different particle size (2.5-3.15 mm fraction), and the average was calculated. The force required to break the granules between the ram and plate of the fracture resistance tester was determined. Granules having a cracking resistance >400 N and those having a cracking resistance <4 N were not included in the formation of the average.

The abrasion values were determined by the rolling drum process according to Busch. For this purpose, 50 g of the granules having a grain size fraction of 2.5-3.15 mm together with 70 steel balls (diameter 10 mm, 283 g) were introduced into a rolling drum of a commercial abrasion tester, e.g. ERWEKA, model: TAR 20, and rolled at 40 rpm for 10 minutes. Subsequently, the contents of the drum were sieved onto a sieve having a mesh size of 5 mm, below which was disposed a sieve having a mesh size of 0.5 mm, on a sieving machine (model: Retsch AS 200 control) for 1 min. The fines fraction sieved off corresponds to the abrasion.

In the performance test, magnesium sulfate granules were used that were composed of synthetic magnesium sulfate monohydrate produced in the following manner:

Calcined magnesite (MgO content about 80-85%) was reacted with about 70% by weight aqueous sulfuric acid in a molar Mg:$H_2SO_4$ ratio of about 0.9. Immediately after the reaction, the solid product obtained at a temperature of about 115-12.0° C. was processed in a pelletizing pan with application by jet nozzle of about 5% to 10% by weight of water to give granules that were then dried on a maturing belt with a dwell time of 1 h. Subsequent classifying gave magnesium sulfate granules having a total magnesium content of 27% by weight, calculated as MgO, and a proportion of water-soluble magnesium of 22.5% by weight, calculated as MgO. About 93% by weight of the granule particles had a grain size in the range from 2 to 5 mm. The proportion of particles having a grain size above 5 mm was less than 1% by weight. The proportion of particles having a grain size below 1 mm was likewise less than 1% by weight. The drying loss of the granules used was about 7% to 9% by weight.

Performance Testing:

The urea used was a commercial urea grill having a nitrogen content of 47% by weight and a grain size of about 0.8 to 2.5 mm. The weight-average diameter ($d_{50}$) was 1.64 mm.

For the experiments, the magnesium sulfate granules were spread out homogeneously on a metal sheet and placed into the heated cabinet at 130° C. for 15, 20, 25 or 30 minutes. One day later, the samples were divided into 4 fractions in a sample splitter. One fraction was used to measure abrasion and one to measure cracking resistance (fractions 1 and 2). Fraction 3 was used to determine drying loss (TV). Fraction 4 was used to conduct the storage test. In addition, the undried magnesium sulfate granules were analyzed as blank sample. Table 1 lists the physical properties of the dried granules thus produced:

TABLE 1

Physical properties of the magnesium sulfate granules

| Time in the drying cabinet | Cracking resistance | Abrasion | TV |
|---|---|---|---|
| 0 min* | 82N | 0.1% | 7.3% |
| 15 min* | 65N | 0.6% | 4.5% |

TABLE 1-continued

Physical properties of the magnesium sulfate granules

| Time in the drying cabinet | Cracking resistance | Abrasion | TV |
|---|---|---|---|
| 20 min | 60N | 1.4% | 1.7% |
| 25 min | 62N | 1.8% | 0.8% |
| 30 min | 62N | 2.2% | 0.1% |

*comparative granules

For the determination of storage stability, the magnesium sulfate granules thus dried were mixed with the urea prills in a weight ratio of 1:1. Subsequently, the mixture was stored at 28° C. and a relative air humidity of 85% RH for 5 minutes, and the sample thus weathered was transferred to a glass vessel that can be closed airtight. The closed sample was then stored at 35° C. for a total of 44 days. At regular time intervals, the mixtures were assessed visually and graded by the following grades:

Grade 1: dry; the granules are in their initial state

Grade 2: first grains become tacky; slightly agglomerating; some individual grains look "moist", urea/magnesium sulfate aggregates usually form Grade 3: partly moistened through; agglomerates of "tacky" urea/magnesium sulfate aggregates form, limited flowability Grade 4: completely moistened through; the entire mixture is moist or wet to an extent of at least 80% by weight, caked and barely still free-flowing; liquid droplets are apparent in some cases.

The results are compiled in table 2:

TABLE 2

Assessment of storage stability of the fertilizer compositions

| Sample* | TV [%] | Storage time | | | | | | | | | | | | |
|---|---|---|---|---|---|---|---|---|---|---|---|---|---|---|
| | | 1 d | 2 d | 3 d | 4 d | 7 d | 9 d | 10 d | 15 d | 17 d | 23 d | 30 d | 37 d | 44 d |
| 0 min | 7.3% | 4 | 4 | 4 | 4 | 4 | 4 | 4 | 4 | 4 | 4 | 4 | 4 | 4 |
| 15 min | 4.5% | 1 | 1 | 1 | 2 | 2 | 2 | 2 | 2 | 2 | 2 | 3 | 3 | 3 |
| 20 min | 1.7% | 1 | 1 | 1 | 1 | 1 | 1 | 1 | 1 | 1 | 2 | 2 | 2 | 2 |
| 25 min | 0.8% | 1 | 1 | 1 | 1 | 1 | 1 | 1 | 1 | 1 | 1 | 1 | 1 | 1 |
| 30 min | 0.1% | 1 | 1 | 1 | 1 | 1 | 1 | 1 | 1 | 1 | 1 | 1 | 1 | 1 |

*Time in the drying cabinet

In a further experiment, the magnesium sulfate, before being applied to a pelletizing pan, was mixed with a defined amount of micronutrients and then processed to give granules with application by jet nozzle of 5% to 11% % by weight of water. As micro-nutrients, 3.3% by weight of borax pentahydrate and 2.9% by weight of zinc sulfate monohydrate were mixed in, which corresponds to a boron content, calculated as $B_2O_3$, of 1.6% by weight and a zinc content, calculated as elemental zinc, of 1.0% by weight. It was found here that the mixture of magnesium sulfate hydrate, borax pentahydrate and zinc sulfate monohydrate could be granulated efficiently. The drying loss of the granules was 10.6% by weight; the proportion of water-soluble magnesium was determined as 22.6% by weight, calculated as MgO. Cracking resistance based on measurements on 56 individual granules of different particle size (2.5-315 mm fraction) was found to be 59 N, and abrasion to be 4.4% by weight.

The invention claimed is:

1. Magnesium sulfate granules, comprising:
at least 90% by weight, based on the total mass of the magnesium sulfate granules, of synthetic magnesium sulfate hydrate and having a drying loss of less than 2% by weight, determined by drying the magnesium sulfate granules at 105° C. and 1 bar for 2 h.

2. The magnesium sulfate granules as claimed in claim 1, having a total magnesium content of at least 26% by weight, calculated as MgO and based on the total weight of the magnesium sulfate granules.

3. The magnesium sulfate granules as claimed in claim 1, in which a proportion of water-soluble magnesium, based on the total mass of the magnesium sulfate granules and calculated as MgO, is in the range from 20% to 25% by weight.

4. The magnesium sulfate granules as claimed in claim 1, in which a proportion of water-insoluble magnesium, based on the total mass of the magnesium sulfate granules and calculated as MgO, is in the range from 1.5% to 7.0% by weight.

5. The magnesium sulfate granules as claimed in claim 1, in which a proportion of water of hydration, determined via the ignition loss at 550° C., is in the range from 18% to 22% by weight, based on the total mass of the magnesium sulfate granules.

6. The magnesium sulfate granules as claimed in claim 1, in which the synthetic magnesium sulfate hydrate is in the form of magnesium sulfate monohydrate to an extent of at least 90% by weight, based on a total mass of magnesium sulfate and water of hydration.

7. The magnesium sulfate granules as claimed in claim 1, in which the proportion of salts other than magnesium sulfate and magnesium oxide is less than 3% by weight, based on the total mass of the magnesium sulfate granules.

8. The magnesium sulfate granules as claimed in claim 1, having an average cracking resistance of at least 30 N, determined on the magnesium sulfate granules having grain sizes in the range of 2.5-3.15 mm.

9. The magnesium sulfate granules as claimed in claim 1, in which at least 90% by weight of the granules have a grain size in the range from 2 to 5 mm.

10. The magnesium sulfate granules as claimed in claim 1, obtainable by a process comprising:
   i) digesting magnesium oxide with aqueous sulfuric acid;
   ii) granulating a reaction mixture obtained in the digestion by a buildup agglomeration to obtain magnesium sulfate granules; and
   iii) drying the magnesium sulfate granules to a drying loss of less than 2% by weight, determined by drying the magnesium sulfate granules at 105° C. and 1 bar for 2 h.

11. The magnesium sulfate granules as claimed in claim 10, wherein the still-hot reaction mixture obtained in the digestion is subjected directly to the buildup agglomeration, and wherein, after the buildup agglomeration, the magnesium sulfate granules obtained are left to undergo a maturation phase.

12. A process for producing the magnesium sulfate granules as claimed in claim 1, comprising:
   i) digesting magnesium oxide with aqueous sulfuric acid;
   ii) granulating a reaction mixture obtained in the digestion by a buildup agglomeration to obtain magnesium sulfate granules; and
   iii) drying the magnesium sulfate granules to a drying loss of less than 2% by weight.

13. The process as claimed in claim 12, wherein the reaction mixture obtained in the digestion is subjected directly to the buildup agglomeration, when it is still hot, and wherein, after the buildup agglomeration, the magnesium sulfate granules obtained are left to undergo a maturation phase.

14. A method for producing a solid, urea-containing fertilizer composition, the method comprising:
mixing the magnesium sulfate granules as claimed in claim 1 and urea.

15. A fertilizer composition in solid, free-flowing form, comprising:
the magnesium sulfate granules as defined in claim 1 and urea in solid form.

16. The fertilizer composition as claimed in claim 15, comprising:
at least 60% by weight, based on the total mass of the fertilizer composition, of a mixture of the magnesium sulfate granules as defined in claim 1 and urea.

17. The fertilizer composition as claimed in claim 15, in which the weight ratio of magnesium sulfate granules to urea is in the range from 2:1 to 1:10.

18. The fertilizer composition as claimed in claim 15, in which the urea is in the form of prilled urea or granulated urea.

19. A process for producing a solid, free-flowing fertilizer composition, comprising:
mixing the magnesium sulfate granules as defined in claim 1 and urea in solid form.

20. The process according to claim 19, wherein the urea in solid form is in the form of urea prills or urea granules.

* * * * *